United States Patent
Basset

(10) Patent No.: US 9,162,772 B2
(45) Date of Patent: Oct. 20, 2015

(54) TANK, A FUEL STORAGE SYSTEM, AND AN AIRCRAFT

(71) Applicant: AIRBUS HELICOPTERS, Marignane, Cedex (FR)

(72) Inventor: Gregory Basset, Martigues (FR)

(73) Assignee: Airbus Helicopters, Marignane Cedex (FR)

( * ) Notice: Subject to any disclaimer, the term of this patent is extended or adjusted under 35 U.S.C. 154(b) by 187 days.

(21) Appl. No.: 13/904,232

(22) Filed: May 29, 2013

(65) Prior Publication Data

US 2013/0320146 A1    Dec. 5, 2013

(30) Foreign Application Priority Data

May 29, 2012 (FR) ..................... 12 01526

(51) Int. Cl.
| | | |
|---|---|---|
| *B64D 1/00* | (2006.01) | |
| *B64D 37/06* | (2006.01) | |
| *B64D 37/32* | (2006.01) | |
| *B64D 37/00* | (2006.01) | |
| *B64D 37/08* | (2006.01) | |
| *B64D 37/16* | (2006.01) | |
| *B64D 37/20* | (2006.01) | |

(52) U.S. Cl.
CPC ............. *B64D 37/06* (2013.01); *B64D 37/005* (2013.01); *B64D 37/08* (2013.01); *B64D 37/16* (2013.01); *B64D 37/20* (2013.01); *B64D 37/32* (2013.01); *Y10T 137/0898* (2015.04); *Y10T 137/86196* (2015.04)

(58) Field of Classification Search
USPC .......... 244/135 R, 135 C; 137/263, 571, 587, 137/588, 590; 60/734
See application file for complete search history.

(56) References Cited

U.S. PATENT DOCUMENTS

| | | | |
|---|---|---|---|
| 2,955,787 A | 10/1960 | Ray et al. | |
| 4,376,446 A * | 3/1983 | Liff .............................. | 137/202 |
| 4,913,380 A | 4/1990 | Vardaman et al. | |
| 6,439,506 B1 | 8/2002 | Schlegel et al. | |
| 2012/0048413 A1 | 3/2012 | Lam et al. | |

FOREIGN PATENT DOCUMENTS

| | | |
|---|---|---|
| WO | 2005079205 A2 | 9/2005 |
| WO | 2010131099 A1 | 11/2010 |

OTHER PUBLICATIONS

Search Report and Written Opinion; Application No. FR 1201526; dated Jan. 13, 2013.

* cited by examiner

*Primary Examiner* — J. Woodrow Eldred
(74) *Attorney, Agent, or Firm* — Brooks Kushman P.C.

(57) ABSTRACT

A storage tank (25) of a storage system. The storage tank (25) includes a container (30) and a dynamic ventilation line (35) incorporated therein, said dynamic ventilation line (35) being provided with an air-no-fuel valve (45) that shuts off in the presence of fuel, the air-no-fuel valve (45) communicating with an internal space (INT) of the container (30) via an upstream pipe (40) placed inside the container (30), a downstream pipe (50) secured to a wall (31) of the container (30) extending from the air-no-fuel valve (45) and opening out into a dynamic air intake (53) communicating with the outside air (200), said storage tank having at least one communication orifice (300) for communicating with other tanks.

18 Claims, 2 Drawing Sheets

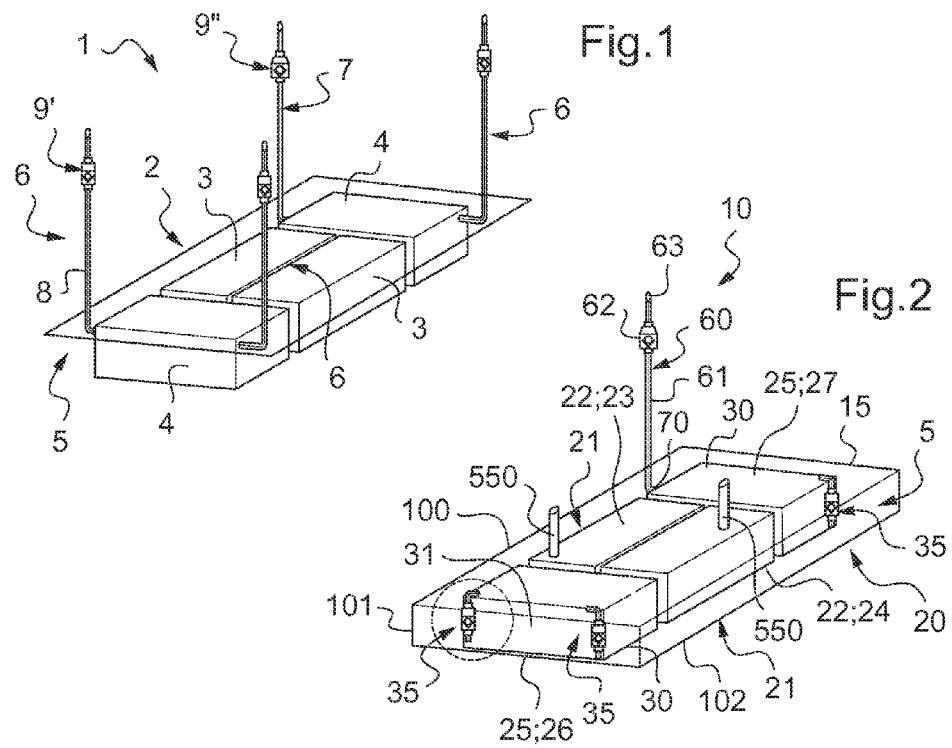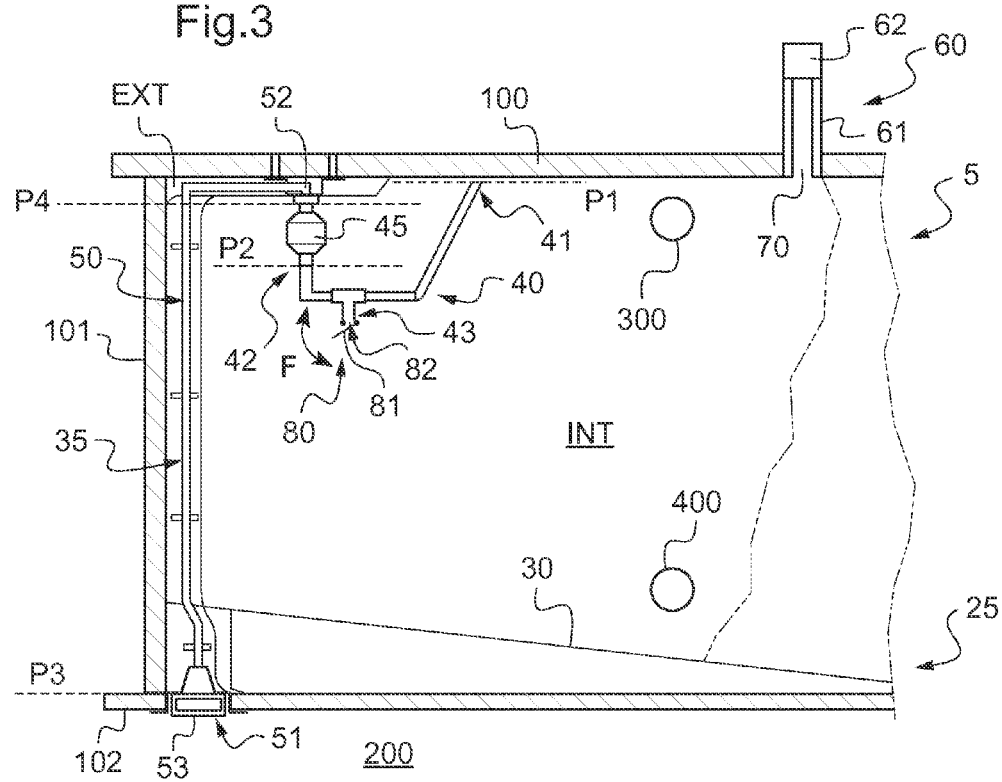

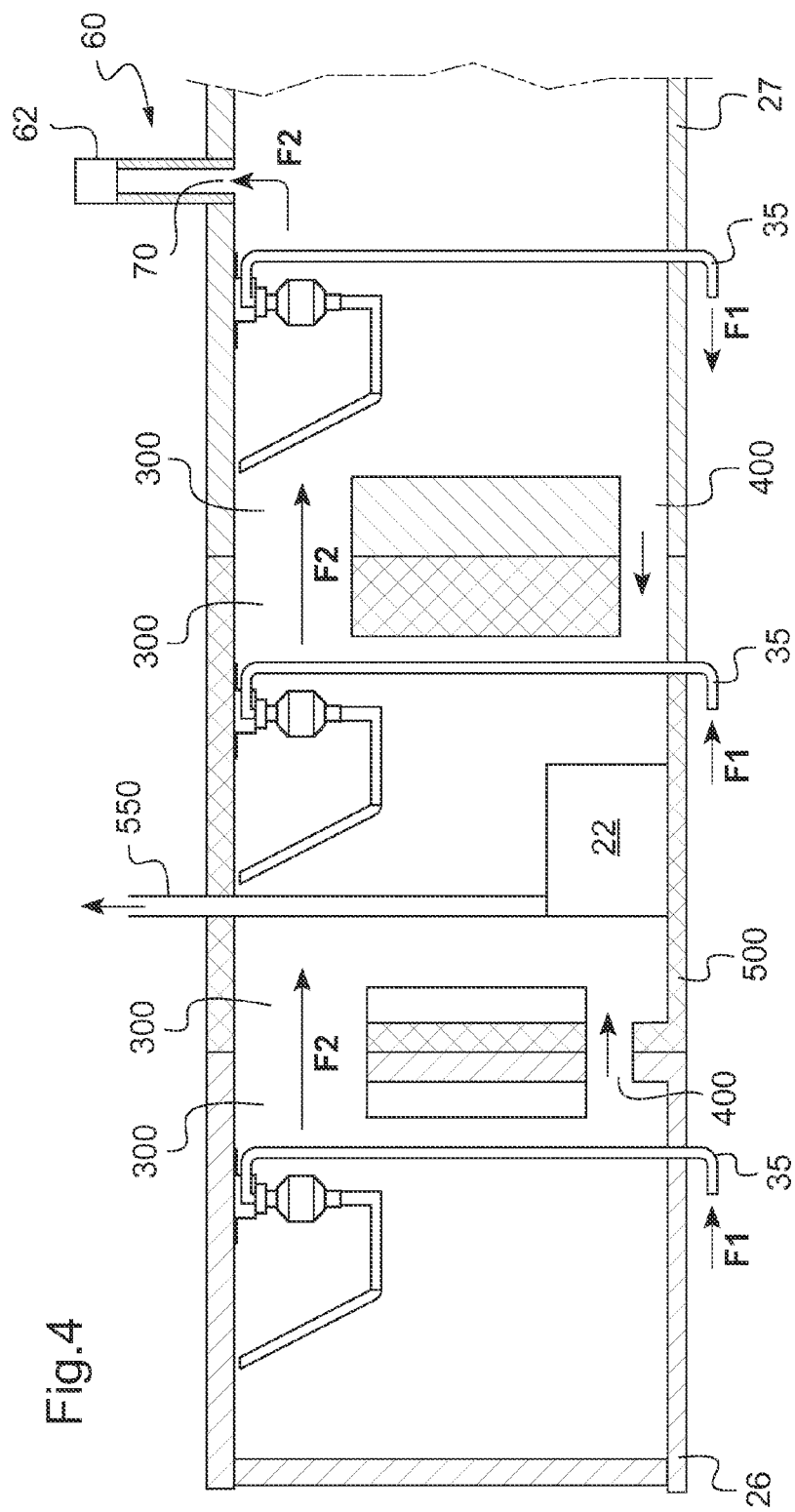

TANK, A FUEL STORAGE SYSTEM, AND AN AIRCRAFT

CROSS REFERENCE TO RELATED APPLICATIONS

This application claims priority to French patent application No. FR 12 01526 filed on May 29, 2012, the disclosure of which is incorporated in its entirety by reference herein.

BACKGROUND OF THE INVENTION (1) Field of the Invention

The present invention relates to a tank, to a fuel storage system, and also to an aircraft fitted with the fuel storage system. The invention relates more particularly, but not exclusively, to an aircraft, and in particular to an aircraft having a rotary wing, it being understood that a rotary wing aircraft presents specific characteristics that give rise to significant differences in comparison with an airplane or a car.

(2) Description of Related Art

A fuel storage system usually includes at least one tank containing fuel.

More precisely, a fuel storage system of an aircraft may comprise one tank group per engine of the aircraft.

Each tank group then includes a receptacle for feeding an engine. Such a receptacle is referred to as a "feeder tank".

The feeder tank may be an independent tank or it may represent a space that always contains fuel and that is arranged within a larger tank. For example, a bell or a bag may define a feeder tank within a larger tank.

Furthermore, each tank group may include at least one tank that transmits fuel to the feeder tank of the group. Such a tank is sometimes referred to as a "main tank".

The tank group may also have removable additional tanks referred to as "ferry tanks".

For convenience, the main and ferry tanks are referred to together below as "storage" tanks, where the function of storage tanks is to store fuel that is to be fed to the feeder tank of the group.

Depending on the architecture, the fuel storage system of an aircraft may thus comprise at least one storage tank and a feeder tank, the feeder tank being arranged within the storage tank.

The storage system may then have transfer means between the storage tanks and the feeder tank to ensure that the feeder tank remains full, at least so long as there is a storage tank that still contains any fuel. This minimizes any risk of unpriming the pump that transfers fuel from the feeder tank to an engine.

In addition, when the aircraft contains a plurality of groups, the storage system is provided with an interconnection system between the groups. The interconnection system serves in particular to balance fuel between the groups.

The storage system usually also includes an expansion volume.

The function of such an expansion volume is to receive a fraction of the fuel stored in the tanks in the event of the fuel expanding. The expansion volume thus avoids creating high levels of tension in the walls of the tanks.

Furthermore, the storage system includes a vent system for exhausting fuel vapor to the outside of the aircraft.

A vent system is designed to prevent stored fuel overflowing while being transferred from one tank to another, or indeed whenever the aircraft presents a large inclination. The term "inclination" is used to mean an angle of the aircraft in pitching and/or in roll or even in yaw.

The vent system takes account of potential risks of siphoning under normal operating conditions.

The tanks of an aircraft and in particular of a rotary wing aircraft are sometimes arranged in the lower section of the aircraft even though the engines are arranged in the top portion of the aircraft.

A vent system then conventionally includes at least one vent line that extends upwards from each tank in order to extend outside the aircraft. At least one vent line may pass via an expansion volume.

A vent line is also provided with a first type of check valve.

Each check valve of the first type is suitable for passing both air and fuel under normal conditions. Nevertheless, beyond a threshold angle of inclination, a valve of the first type closes so as to prevent fuel from flowing through.

Under such circumstances, a valve of the first type could be referred to as a "valve for preventing overflow after rolling over". Nevertheless, a valve of the first type is referred to below more simply and for convenience as an "anti-overflow" valve. Such a valve is sometimes also referred to as a "roll-over" valve. The anti-overflow valve thus serves to connect the tanks to the outside air, except during extreme circumstances leading to the aircraft being excessively inclined.

The vent system also includes breather lines having a second type of check valve, known as an "air-no-fuel" valve. Each air-no-fuel valve is suitable for passing a gas, such as air and/or fuel vapor, for example. In contrast, an air-no-fuel valve prevents fuel from passing independently of flying conditions and independently of the attitude of the aircraft.

Such a storage system is in widespread use.

Nevertheless, on an aircraft and in particular on a rotary wing aircraft, the tanks are arranged in a bottom portion of the aircraft. More particularly, the tanks may be arranged in the lower section of the aircraft.

In order to connect with the outside of the aircraft, the vent lines and the breather lines extend upwards from the tanks. The vent lines and the breather lines then pass through compartments of the aircraft before reaching the outside.

The vent and breather lines extend upwards from the tanks in order to avoid unwanted overflow of fuel in flight as a result of a valve malfunctioning.

If a vent or breather line opens out to the side of an aircraft, a malfunction of a valve can lead to fuel overflowing from the aircraft when performing a tight turn.

Aircraft certification regulations are strict in terms of safety and can require each vent and breather line to be made up of double-skinned pipes.

Such a double-skinned pipe comprises an internal pipe running inside an external pipe. Fuel vapor then passes along the internal pipe. A drain system may be provided between the internal and external pipes.

Vent and breather lines of that type then present manufacturing costs and weight that are not negligible.

The technological background includes document U.S. Pat. No. 6,439,506.

That document U.S. Pat. No. 6,439,506 describes a ventilation valve.

Document US 2012/0048413 describes a vent system for an airplane having a tank dedicated to system breathing.

Document WO 2010/131099 describes a fuel vapor vent valve having a dynamic pressure limiter.

Also known are the following documents: U.S. Pat. No. 2,955,787 A, U.S. Pat. No. 4,913,380 A, and WO 2005/079205 A2.

BRIEF SUMMARY OF THE INVENTION

The present invention thus seeks to propose a storage tank for a storage system containing fuel and seeking at least to minimize the use of double-skinned pipes.

According to the invention, a storage tank of a storage system includes a container suitable for containing fuel and a dynamic ventilation line incorporated therein. The dynamic ventilation line is provided with an air-no-fuel valve that shuts off in the presence of fuel, the air-no-fuel valve communicating with an internal space of the container via an upstream pipe placed inside the container, a downstream pipe secured to a wall of the container extending from the air-no-fuel valve to the outside air.

It should be observed that the term "pipe" is used to designate a duct constituted by a single piece of pipework or a plurality of pieces of pipework connected one after another.

Under such circumstances, the invention proposes a storage tank having its own dynamic ventilation line. An operator can thus easily arrange the storage tank in a compartment provided for this purpose.

Furthermore, the downstream pipe that opens to the outside of the storage tank is incorporated in the storage tank. This downstream pipe is thus placed in the compartment of the storage tank together with the container, unlike devices in the prior art.

By definition, such a container is drained and does not include any equipment that requires the use of a double-skinned pipe. The downstream pipe may thus be made using a simple pipe, thereby solving the technical problem posed.

In addition, the storage tank is relatively easy to put into place, since all of the components of the storage tank can be assembled in a workshop, and thus away from the vehicle that is fitted with the tank.

The storage tank may also include one or more of the following characteristics.

For example, the air-no-fuel valve may be arranged in the internal space defined by the container. This air-no-fuel valve then has no effect on the overall size of the storage tank.

In another aspect, the downstream pipe is either present in the internal space or is embedded at least in part in at least one wall of the container, or else is fastened to the container externally relative to the internal space.

Independently of the variant, the downstream pipe is a component of the storage tank. This downstream pipe may then be arranged solely in the compartment that receives the storage tank, while also projecting from the compartment to the outside of the vehicle.

Furthermore, the upstream pipe may extend from a free upstream distal end towards a downstream proximal end fastened to the air-no-fuel valve.

The upstream distal end may then be contained in a first plane, the upstream proximal end being contained in a second plane, the first plane being above the second plane.

The arrangement of an air-no-fuel valve in a container is then not incompatible with venting a top portion of the container. The upstream distal end may thus open out to the top portion of the internal space.

It should be observed that terms such as "top", "bottom", "above" should be considered when the aircraft is standing on the ground under normal conditions, e.g. not after a crash.

The downstream pipe may also extend from a free downstream distal end opening out to the outside air towards a downstream proximal end fastened to the air-no-fuel valve.

The downstream distal end may be contained in a third plane, and the downstream proximal end may be contained in a fourth plane, with the fourth plane being above the third plane.

Consequently, the downstream pipe does not extend above the container, but on the contrary goes down along the container in order to open out to the outside in a plane lying under the container.

This particular arrangement presents the advantage of minimizing the introduction of moisture into the container of the storage tank.

In an embodiment, the upstream pipe extends from a free upstream distal end towards an upstream proximal end fastened to the air-no-fuel valve, said downstream pipe extending from a free downstream distal end towards a downstream proximal end fastened to the air-no-fuel valve, the upstream distal end being contained in a first plane that is above a second plane containing said upstream proximal end, the second plane being above a third plane containing the downstream distal end.

Furthermore, the free downstream distal end of the downstream pipe may include a dynamic air intake, e.g. provided with an NACA (National Advisory Committee to Aeronautics) air intake.

Thus, when the storage tank is arranged on an aircraft, the dynamic air intake serves to pressurize the storage tank in flight. The pressure exerted by the air on the fuel contained therein tends to cause the fuel to flow from the storage tank towards the engines. This characteristic can contribute to eliminating or minimizing the need for a booster pump, for example.

The storage system is then a dynamically ventilated storage system, unlike the prior art that provides static air intake.

The upstream pipework present in the internal space may also include a low point having a drain valve.

The maneuvers of the vehicle having the storage tank and/or thermal expansion of the fuel can lead to fuel penetrating into the upstream pipe. This fuel is blocked by the air-no-fuel valve.

Nevertheless, the fuel might then remain in the upstream pipe.

Under such circumstances, the drain valve allows the fuel present in the upstream pipe to be returned to the container. More precisely, fuel may be returned to the container once the level of fuel in the container no longer reaches the drain valve.

Finally, the storage tank may have an outlet suitable for being connected to a vent line that extends upwards from the storage tank and that includes an anti-overflow valve that closes only beyond a threshold angle of inclination.

In addition to a storage tank, the invention provides at least one storage system having a least one storage tank communicating with at least one feeder tank. The feeder tank may comprise an outer tank with a feeder tank proper therein. The feeder tank also communicates via interconnection means with at least one storage tank.

The storage system further includes a vent line extending upwards from an outlet of at least one storage tank and having an anti-overflow valve that shuts off only beyond a threshold angle of inclination.

This storage system is remarkable in particular in that each storage tank is a tank of the above-described type.

The storage system may comprise at least one feeder tank fed with fuel by at least one storage tank. For example, the storage system may include one storage group per engine to be fed with fuel, each storage group having at least one storage tank and a feeder tank.

The storage system may include at least two interconnected storage groups, each storage group including at least one storage tank and a feeder tank. Each storage tank is of the above-described type, with at least one storage tank of a group also communicating with a single vent line.

At least one storage tank may also be common to a plurality of storage groups. Thus, the system may comprise two feeder tanks communicating with a common storage tank.

When the storage system includes a plurality of groups, a single storage tank of the system may co-operate with one vent line, while each storage tank includes at least one dynamic ventilation line incorporated therein.

This characteristic makes it possible to simplify the storage system.

The invention also provides an aircraft provided with such a storage system. The storage system comprises at least one storage tank, each storage tank being arranged in a tank compartment, and each storage tank including a container and an incorporated dynamic ventilation line. Each dynamic ventilation line is contained solely in a tank compartment and leads to the outside air via a downstream distal end, each dynamic ventilation line being provided with an air-no-fuel valve that shuts off in the presence of fuel, the air-no-fuel valve communicating with an internal space of the container via an upstream pipe placed in the container, a downstream pipe secured to a wall of the container extending from the air-no-fuel valve to the outside air present outside the aircraft.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a view showing a storage system of the prior art;

FIG. 2 is a view showing an aircraft provided with a storage system of the invention;

FIG. 3 is a section view showing a tank of the invention; and

FIG. 4 is a section view explaining operation of the storage system.

Elements present in more than one of the figures are given the same references in each of them.

DETAILED DESCRIPTION OF THE INVENTION

FIG. 1 shows an aircraft 1 having a storage system of the prior art.

The storage system comprises two interconnected tank groups arranged in at least one tank compartment 5, each group feeding fuel to an engine.

Under such circumstances, a tank group includes a feeder tank 3 communicating with an engine. Each group also includes at least one storage tank 4 communicating with a feeder tank 3.

Each storage tank 4 is provided with a breather line 6 having a breather pipe 8 and an air-no-fuel valve 9'. Each breather line 6 extends upwards from the storage tank 4 and passes through adjacent compartments of the aircraft 1, the breather pipe 8 having at least one double-skinned duct.

Furthermore, at least one storage tank of a group of tanks has a vent line 7. The vent line 7 has a vent pipe 7 and an anti-overflow valve 9". The vent line 7 extends upwards from a storage tank 4 and passes through adjacent compartments of the aircraft 1, the vent line 7 possessing at least one double-skinned duct.

FIG. 2 shows an aircraft 1 having a storage system 20 of the invention. The representation of the aircraft 1 is limited to the storage system 20 in order to avoid pointlessly overcrowding FIG. 2.

The aircraft 1 has at least one tank compartment 5 dedicated to storing fuel. Such a tank compartment 5 may have a top surface 100, a side surface 101, and a bottom surface 102 at the interface with the outside air 200 present outside the aircraft 1. For example, the compartment 5 is arranged in the lower section of a rotary wing aircraft, the top surface 100 possibly representing the floor of the cabin of the aircraft.

The storage system has at least one group 21 of tanks. Each group 21 is provided with a feeder tank 22 and a storage tank 25.

In the example shown, the storage system has a first storage group fitted with a first feeder tank 23 communicating with at least one first storage tank 26. In addition, the storage system has a second storage group fitted with a second feeder tank 24 communicating with at least one second storage tank 27 and with the first feeder tank 23.

It should be observed that in certain variants, a feeder tank represents a reserved space within a storage tank.

All of the feeder and storage tanks 22 and 25 are arranged in a tank compartment 5.

Each storage tank 25 includes a container 30. Such a container may also be provided with flexible walls 31 or indeed a receptacle defined by rigid walls 31.

Furthermore, it can be seen that the feeder tanks do not have vent means. Each feeder tank is provided with containers that are connected neither to a vent line nor to a dynamic ventilation line.

In contrast, each storage tank 25 is provided with at least one dynamic ventilation line 35 incorporated in the storage tank 25.

It can be understood that a feeder tank may be ventilated by means of a storage tank in communication with the feeder tank.

With reference to FIG. 3, each dynamic ventilation line is provided in succession with an upstream pipe 40, an air-no-fuel valve 45 that shuts off in the presence of fuel, and then a downstream pipe 50.

Under such circumstances, the upstream pipe 40 is arranged in the internal space INT defined by the container 30 of the storage tank 25. The upstream pipe 40 extends inside the container 30 from an upstream distal end 41 opening out into the top portion of the container 30 towards an upstream proximal end 42 fastened of the air-no-fuel valve 45.

This air-no-fuel valve is also advantageously present in the internal space INT.

Under such conditions, the upstream distal end 41 is contained in a first plane P1. Furthermore, the upstream proximal end 42 is contained in a second plane P2. When the aircraft is standing on the ground in a normal attitude, the first plane P1 is above the second plane P2.

Furthermore, the downstream pipe 50 extends from a downstream proximal end 52 fastened to the air-no-fuel valve 45 towards a downstream distal end 51 opening out to the open air.

This downstream distal end 51 may then be provided with a dynamic air intake 53. When the aircraft 1 is moving forwards, air penetrates into the storage tank via the dynamic ventilation line 45. This air advantageously serves to pressurize the storage tank.

More precisely, the downstream proximal end 52 is contained in a fourth plane P4. The downstream distal end 51 is then contained in a third plane P3. When the aircraft is standing on the ground in a normal attitude, the fourth plane P4 is then above the third plane P2.

Furthermore, the second plane P2 is also above the third plane P3.

The downstream distal end 51 contained in the third plane then represents the low point of the dynamic ventilation line.

In other words, the downstream pipe 50 does not extend above the container but goes down below the container to reach the open air. The downstream pipe therefore does not pass through the top surface 100 of the tank compartment 5, but on the contrary it goes to the bottom surface 102 of the tank compartment 5.

Furthermore, the downstream pipe constitutes a portion of the storage tank 25. The downstream pipe 50 is thus secured to a wall 31 of the container 30, extending from the air-no-fuel valve 45 to the outside air 200.

This downstream pipe 50 may equally well be present in the internal space INT or be embedded at least in part in at least one wall 31 of said container 30 as shown in FIG. 3, or else it may be fastened to the container 30 externally EXT relative to said internal space INT but still inside the tank compartment 5.

A maneuver of the aircraft or an expansion of the fuel can lead to fuel passing into the upstream pipe 40. Nevertheless, this fuel is blocked by the air-no-fuel valve 45.

There is therefore no risk of the fuel escaping from the container via a dynamic ventilation line.

In contrast, fuel runs the risk of remaining blocked in the upstream pipe and preventing venting. When the aircraft has a dynamic air intake, the pressure exerted by the air might possibly enable the fuel contained in the upstream pipe to be discharged into the container.

However, in an embodiment, the storage tank is provided with a drain valve arranged at a low point 43 of the upstream pipe 40.

This drain valve 80 serves to empty the fuel contained in the upstream pipe 40 into the container.

This drain valve 80 is advantageously a member that operates automatically and mechanically.

For example, the drain valve 80 may have a valve member 81 co-operating with a drain orifice 82 of the upstream pipe 40. The valve member may be a flap suitable for moving as indicated by double-headed arrow F. Other types of valve member are possible, such as valve members involving balls, for example.

At least one storage tank has an outlet 70 connected to a vent line 60.

The vent line 60 is provided with a vent pipe 61 that extends upwards from the storage tank 25 to reach an anti-overflow valve 62. The vent pipe 61 thus passes through adjacent compartments that are distinct from the tank compartments.

Under such circumstances, the vent pipe 61 has a double-skinned duct.

The anti-overflow valve 62 is a valve that closes only beyond a threshold angle of inclination. When there is no such inclination, both air and fuel can pass through the anti-overflow valve 62. The storage system is thus continuously in contact with the air, except during an excessive angle of inclination. Reference may be made to the literature in order to obtain a description of an anti-overflow valve.

It should be observed that the vent line 60 may co-operate with an expansion system suitable for receiving fuel in the event of the fuel expanding thermally, for example.

With reference to FIG. 2, a single storage tank of the storage system has such a vent line 60. Under such circumstances, the architecture is simplified and the number of double-skinned ducts is thus minimized. This vent line 60 also has a static air intake 63.

It can also be understood that the first storage tank 26 can communicate directly with the second storage tank 27 having a vent line, and thus without passing via a feeder tank.

FIG. 4 explains the operation of a storage system.

This system includes in particular a left storage tank situated on the left of FIG. 4, a right storage tank situated on the right of FIG. 4, and a central storage tank communicating with the left and right storage tanks. The central storage tank also receives a feeder tank 22.

It can be seen that each tank has a communication orifice 300 in its top portion, and a communication system 400 in its bottom portion. The central storage tank has two communication orifices 300 communicating in both-way manner with the communication orifices 300 of the left and right storage tanks. Furthermore, the central storage tank has two communication systems 400 communicating in one-way manner with the communication systems 400 of the left and right storage tanks.

Under such circumstances, air that penetrates dynamically into a storage tank along arrows F1 tends to expel gas vapors along arrows F2 towards the vent line 60 of the right storage tank.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A storage tank of a fuel storage system of an aircraft, wherein the storage tank includes a container and a dynamic ventilation line incorporated therein, the dynamic ventilation line being provided with an air-no-fuel valve that shuts off in the presence of fuel, the air-no-fuel valve communicating with an internal space (INT) of the container via an upstream pipe placed inside the container, a downstream pipe secured to a wall of the container extending from the air-no-fuel valve and opening out into a dynamic air intake communicating with the outside air, the storage tank having at least one communication orifice for communicating with other tanks, wherein the upstream pipe extends from a free upstream distal end towards an upstream proximal end fastened to the air-no-fuel valve, the upstream distal end being contained in a first plane (P1), the upstream proximal end being contained in a second plane (P2), the first plane (P1) being above the second plane (P2).

2. A storage tank according to claim 1, wherein the air-no-fuel valve is arranged in the internal space (INT).

3. A storage tank according to claim 1, wherein the downstream pipe is either present in the internal space (INT) or is embedded at least in part in at least one wall of the container, or else is fastened to the container externally (EXT) relative to the internal space (INT).

4. A storage tank according to claim 1, wherein the downstream pipe extends from a downstream distal end fastened to the dynamic air intake towards a downstream proximal end fastened to the air-no-fuel valve, the downstream distal end being contained in a third plane (P3), the downstream proximal end being contained in a fourth plane (P4), the fourth plane (P4) being above the third plane (P3).

5. A storage tank according to claim 1, wherein upstream pipe extends from a free upstream distal end towards an upstream proximal end fastened to the air-no-fuel valve the downstream pipe extending from a free downstream distal end towards a downstream proximal end fastened to the air-no-fuel valve, the upstream distal end being contained in a first plane (P1) that, when on the ground, is above a second plane (P2) containing the upstream proximal end, the second plane (P2), when on the ground, being above a third plane (P3) containing the downstream distal end.

6. A storage tank according to claim 1, wherein the upstream pipe present in the internal space (INT) includes a low point provided with a drain valve.

7. A storage tank according to claim 1, wherein the storage tank has an outlet connected to a vent line extending upwards from the storage tank, the vent line having an anti-overflow valve that shuts off only beyond a threshold angle of inclination, and also having a static air intake.

8. A storage system having at least one storage tank communicating with at least one feeder tank, the storage system including a vent line extending upwards from an outlet of the at least one storage tank and having an anti-overflow valve that shuts off only beyond a threshold angle of inclination, wherein each storage tank includes a container and a dynamic ventilation line incorporated therein, the dynamic ventilation line being provided with an air-no-fuel valve that shuts off in the presence of fuel, the air-no-fuel valve communicating with an internal space (INT) of the container via an upstream pipe placed inside the container, a downstream pipe secured to a wall of the container extending from the air-no-fuel valve and opening out into a dynamic air intake communicating with the outside air, the storage tank having at least one communication orifice for communicating with other tanks, and each tank communicating with at least one adjacent tank via a communication orifice.

9. A storage system according to claim 8, wherein the storage system includes at least one feeder tank fed with fuel by at least one storage tank.

10. A storage system according to claim 8, wherein the storage system includes one storage group per engine to be fed with fuel, each storage group having at least one storage tank and a feeder tank.

11. A system according to claim 10, wherein the storage system has at least two interconnected storage groups, each storage group including at least one storage tank and a feeder tank, each storage tank being provided in a fuel storage system of an aircraft, wherein at least one storage tank includes a container and a dynamic ventilation line incorporated therein, the dynamic ventilation line being provided with an air-no-fuel valve that shuts off in the presence of fuel, the air-no-fuel valve communicating with an internal space (INT) of the container via an upstream pipe placed inside the container, a downstream pipe secured to a wall of the container extending from the air-no-fuel valve and opening out into a dynamic air intake communicating with the outside air, and at least one communication orifice for communicating with other tanks, and only one storage tank being provided with a vent line.

12. An aircraft, that is provided with a storage system according to claim 8, the storage system comprising at least one storage tank, each storage tank being arranged in a tank compartment, each storage tank including a container and a dynamic ventilation line incorporated therein, each dynamic ventilation line being contained solely in a tank compartment and opening out to the outside air via a downstream distal end, each dynamic ventilation line being provided with an air-no-fuel valve that shuts off in the presence of fuel, the air-no-fuel valve communicating with an internal space (INT) of the container via an upstream pipe placed in the container, a downstream pipe secured to a wall of the container extending from the air-no-fuel valve to open out at a dynamic air intake communicating with the outside air, the storage tank having at least one communication orifice for communicating with other tanks.

13. A storage system according to claim 8, wherein the air-no-fuel valve is arranged in the internal space (INT).

14. A storage system according to claim 8, wherein the downstream pipe is either present in the internal space (INT) or is embedded at least in part in at least one wall of the container, or else is fastened to the container externally (EXT) relative to the internal space (INT).

15. A storage system according to claim 8, wherein said upstream pipe extends from a free upstream distal end towards an upstream proximal end fastened to the air-no-fuel valve, said upstream distal end being contained in a first plane (P1), said upstream proximal end being contained in a second plane (P2), said first plane (P1) being above the second plane (P2).

16. A storage system according to claim 15, wherein the downstream pipe extends from a downstream distal end fastened to the dynamic air intake towards a downstream proximal end fastened to the air-no-fuel valve, the downstream distal end being contained in a third plane (P3), the downstream proximal end being contained in a fourth plane (P4), the fourth plane (P4) being above the third plane (P3).

17. A storage system according to claim 8, wherein upstream pipe extends from a free upstream distal end towards an upstream proximal end fastened to the air-no-fuel valve, the downstream pipe extending from a free downstream distal end towards a downstream proximal end fastened to the air-no-fuel valve, the upstream distal end being contained in a first plane (P1) that, when the ground, is above a second plane (P2) containing the upstream proximal end, the second plane (P2), when on the ground, being above a third plane (P3) containing the downstream distal end.

18. A storage system according to claim 8, wherein the upstream pipe present in the internal space (INT) includes a low point provided with a drain valve.

* * * * *